(12) United States Patent
Chen et al.

(10) Patent No.: US 10,012,436 B2
(45) Date of Patent: Jul. 3, 2018

(54) MULTIPLE PASS, PARALLEL FLOW DOWNCOMER TRAY FOR A MASS TRANSFER COLUMN

(71) Applicants: Guang X. Chen, Williamsville, NY (US); Steven C. Brown, Williamsville, NY (US); John P. Ricotta, Kenmore, NY (US)

(72) Inventors: Guang X. Chen, Williamsville, NY (US); Steven C. Brown, Williamsville, NY (US); John P. Ricotta, Kenmore, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 384 days.

(21) Appl. No.: 14/927,890

(22) Filed: Oct. 30, 2015

(65) Prior Publication Data
US 2017/0122662 A1 May 4, 2017

(51) Int. Cl.
*B01D 3/22* (2006.01)
*F25J 3/04* (2006.01)
*B01D 3/16* (2006.01)
*B01D 3/14* (2006.01)

(52) U.S. Cl.
CPC .......... *F25J 3/04412* (2013.01); *B01D 3/14* (2013.01); *B01D 3/16* (2013.01); *B01D 3/22* (2013.01); *B01D 3/225* (2013.01)

(58) Field of Classification Search
CPC . B01D 3/20; B01D 3/22; B01D 3/225; B01D 3/14; B01D 3/16
See application file for complete search history.

(56) References Cited

U.S. PATENT DOCUMENTS

| 3,434,701 | A | | 3/1969 | Bauer |
| 4,129,626 | A | | 12/1978 | Mellbom |
| 4,496,430 | A | * | 1/1985 | Jenkins .................... B01D 3/22 196/111 |
| 4,582,569 | A | * | 4/1986 | Jenkins .................... B01D 3/22 196/111 |
| 5,223,183 | A | | 6/1993 | Monkelbaan et al. |
| 5,318,732 | A | | 6/1994 | Monkelbaan et al. |
| 6,131,891 | A | * | 10/2000 | Resetarits ................ B01D 3/20 202/158 |

(Continued)

FOREIGN PATENT DOCUMENTS

GB 828655 2/1960

*Primary Examiner* — Jonathan Miller
(74) *Attorney, Agent, or Firm* — Robert J. Hampsch

(57) ABSTRACT

A multiple pass, parallel flow downcomer tray for a mass transfer column and method for liquid-vapor contacting in a mass transfer column is provided. The multiple pass, parallel flow downcomer tray has at least four mass transfer decks configured to provide contact between an ascending vapor passing upward through apertures on the tray surface and a traversing liquid on the tray surface. The tray further includes a central downcomers disposed near a central axis of the tray and two or more peripheral downcomers disposed near the edge of the tray and spaced apart from the central axis, wherein at least two of the four mass transfer decks are configured to discharge the traversing liquid into the peripheral downcomers and two of the four mass transfer decks are configured to discharge the traversing liquid into the central downcomer.

29 Claims, 3 Drawing Sheets

(56) References Cited

U.S. PATENT DOCUMENTS

| | | | | |
|---|---|---|---|---|
| 6,371,455 | B1 * | 4/2002 | Lee | B01D 3/20 |
| | | | | 261/114.1 |
| 6,799,752 | B2 * | 10/2004 | Wu | B01D 3/163 |
| | | | | 261/114.2 |
| 6,824,750 | B2 | 11/2004 | Bravo | |
| 7,204,427 | B2 | 4/2007 | Patrice | |
| 7,204,477 | B2 * | 4/2007 | Xu | B01D 3/008 |
| | | | | 261/114.1 |
| 7,234,691 | B2 * | 6/2007 | Kovak | B01D 3/141 |
| | | | | 202/158 |
| 7,510,173 | B2 * | 3/2009 | Konijn | B01D 3/20 |
| | | | | 261/114.1 |
| 8,136,799 | B2 * | 3/2012 | Griepsma | B01D 3/163 |
| | | | | 261/114.5 |
| 9,295,926 | B2 * | 3/2016 | Nieuwoudt | B01D 3/225 |
| 2007/0145612 | A1 * | 6/2007 | Konijn | B01D 3/20 |
| | | | | 261/114.5 |

* cited by examiner

MULTIPLE PASS, PARALLEL FLOW DOWNCOMER TRAY FOR A MASS TRANSFER COLUMN

TECHNICAL FIELD

The present invention relates to mass transfer columns, and, more particularly, to a multiple pass vapor-liquid contacting tray and downcomer assembly employed in such mass transfer columns such as distillation columns in cryogenic air separation plants.

BACKGROUND

In the art of mass transfer for selectively separating at least one component from a mixture of at least two constituents as for example in distillation columns of an air separation plant, an upwardly flowing vapor or gas stream is typically contacted on a substantially horizontally aligned contacting tray with a generally downwardly flowing liquid stream. In a conventional distillation process, such contacting permits the upwardly flowing vapor or gas stream to become selectively enriched with the lighter components of the mixture, i.e., those components with relatively high volatilities, while the generally downwardly flowing liquid stream becomes selectively enriched with the heavier component of relatively low volatilities. A variety of types of gas-liquid contacting trays have been conventionally employed in the above described mass transfer operations, to effect intimate contacting between the respective gas and liquid phases. Features common to the various types of contacting trays are downcomers, weirs and the active area, briefly described in the paragraphs that follow.

The area of the tray deck which contains the apertures in conventional vapor-liquid contact trays is often referred to as the "active area" of the contacting tray because the vapor-liquid interaction occurs above the apertures in the tray. In general, the liquid and vapor handling capacity of the tray is limited by the available active area of the tray as well as the area of the downcomer. If the amount of descending liquid or ascending vapor exceeds the tray capacity, flooding of the tray will occur as either the entrained liquid is unable to adequately disengage from the associated vapor stream or the vapor is unable to disengage from the liquid stream.

A weir is also used on most vapor-liquid contacting trays to cause liquid to accumulate on the top surface of the tray for enhanced interaction with the vapor bubbling through the apertures in the tray deck. The vapor and liquid interaction on the tray desirably causes a froth to build up on the tray. Because the liquid phase remains substantially continuous in the froth, the vapor and liquid interaction continues in the froth and results in greater mass transfer efficiencies.

Downcomers are conventionally provided in combination with the vapor-liquid contacting trays to provide a passage through which liquid is discharged from one tray to an underlying tray. In single pass trays, the downcomers are provided at opposite ends of vertically adjacent trays so the liquid must flow completely across one tray before it enters the downcomer for passage to the next lower tray. The liquid on the lower tray then flows in the opposite direction across the tray and enters another downcomer. This back-and-forth flow pattern is repeated as the liquid descends through the portion of the column containing the vapor-liquid contact trays. In many two-pass trays, the descending liquid is split into two streams which travel in opposite directions on each contacting tray. A center downcomer is usually provided on alternate trays while two end downcomers are placed at opposite ends of vertically adjacent trays to provide the two pass flow pattern. Finally, multiple pass contacting trays have also been utilized and are typically configured to include a plurality of chordal downcomers to reduce weir loading.

High pressure distillation systems often require high liquid rate contacting trays. For example, contacting trays operating at very high liquid rates must have large liquid handling capability, which in turn requires proper sizing and orientation of the downcomers on the contacting trays. In other words, the efficiency of mass transfer of a given component between these phases in high liquid rate distillation systems is determined largely by the configuration of the downcomers on the contacting trays.

In a well-known classic study by W. K. Lewis in 1936, it was found that the mass transfer efficiency of vapor-liquid contacting trays could be maximized by bringing an unmixed vapor into contact with liquid flows across each successive tray in the same direction (Case 2). The Case 2 is referred to as a parallel flow, which, as used herein, refers to liquid flows on vertical adjacent or successive trays rather than to liquid flows on a single tray. Lewis' Case 2 ensures that the driving force for mass transfer on a given tray is nearly the same regardless of where that mass transfer occurs on the tray. Because of this, substantial increases in efficiency can be obtained when using a tray operated according to Lewis' Case 2.

U.S. Pat. No. 5,223,183 to Monkelbaan, et al. teaches a parallel flow tray with at least one central downcomer and no side downcomers. The downcomers of each tray are aligned with the downcomers on the other trays such that the downcomers on one tray are immediately below those on the tray above. The outlets of one downcomer are directly above the inlet of another. A pair of inclined liquid deflecting baffles over each downcomer connects the outlets and inlets of vertically adjacent downcomers and provides a crisscrossing liquid flow path. The downcomer baffles prevent liquid from the tray above from entering each downcomer and define the direction of liquid flow onto the tray deck. The inclined surface of the baffle also imparts a horizontal momentum to the descending liquid which tends to push the liquid and froth present on the tray towards the inlet of the outlet downcomer for this portion or zone of the tray.

U.S. Pat. No. 5,318,732 to Monkelbaan, et al. teaches yet another parallel flow multiple downcomer type contacting tray, which increases tray capacity by providing imperforate stilling decks that extend across the tray deck surface outward from the downcomer inlet opening together with vertical inlet weirs attached to the outer end of the stilling decks. The inlet weirs may function as pre-weirs used in addition to the conventional inlet weir formed by the upward extension of the downcomer side wall. Further, the stilling decks help reduce pinching; however they also reduce the active area of the deck.

U.S. Pat. No. 7,204,427 to Xu et al. teaches still further parallel flow multiple downcomer type contacting trays. In the disclosed embodiments, side downcomers are incorporated into a parallel flow multiple downcomer tray having a center baffle and the downcomers have an inclined side wall that directs liquid onto the deck below. The inclined side wall also provides additional volume above the inferior downcomer inlet to reduce pinching at this inlet without the need for a stilling deck of the type disclosed in U.S. Pat. No. 5,318,732 to Monkelbaan, et al.

There is a need for improved high-capacity contacting trays that improve the overall mass transfer efficiencies by combining the features and benefits of a Lewis Case 2 parallel flow pattern and multiple pass tray configurations.

SUMMARY OF THE INVENTION

The present invention may be characterized as a multiple pass downcomer tray for a mass transfer column comprising: (i) an annular tray having a tray surface; (ii) an annular support ring attached to the tray; (iii) at least four mass transfer decks on the tray surface of the annular tray and each of the at least four mass transfer decks having a plurality of apertures through the tray surface, and wherein each mass transfer deck being disposed adjacent to at least two other mass transfer decks and configured to provide contact between an ascending vapor passing through the apertures and a traversing liquid on the tray surface; and (iv) a plurality of downcomers configured for collecting and discharging the liquid from the mass transfer decks. The plurality of downcomers include one or more central downcomers disposed proximate a central axis of the annular tray and two or more peripheral downcomers disposed proximate the annular support ring and spaced apart from the central axis, wherein each of the downcomers define a channel for a descending liquid flow.

At least two of the at least four mass transfer decks are configured to discharge the traversing liquid into the two or more peripheral downcomers and at least two of the at least four mass transfer decks are configured to discharge the traversing liquid into the one or more central downcomers. Further, the liquid flow traversing each of the at least four mass transfer decks is in the opposite direction to the liquid flow traversing in at least two adjacent mass transfer sections.

The multiple pass downcomer trays may be a sieve tray where the apertures in the mass transfer decks are a plurality of holes. Optionally, the apertures may also comprise a plurality of vapor-directing slots disposed in the tray surface to promote the movement of liquid across the mass transfer decks. Alternatively, the multiple pass downcomer trays may be a valve tray where the apertures are a plurality of openings with moveable valves or fixed valve structure disposed above the openings.

The multiple pass downcomer tray also preferably include the following features: (1) a plurality of liquid channel structures or chutes disposed on the tray surface proximate each downcomer and configured for receiving a descending liquid and dispersing the descending liquid to one or more of the mass transfer decks; (2) a plurality of weirs disposed proximate each downcomer and configured to impede the traversing liquid flow to the downcomers; (3) a liquid receiving pan disposed on the tray surface; (4) a perforated baffle disposed on the liquid receiving pan and configured to improve distribution of the liquid to the mass transfer areas; (5) one or more bubble forming structures disposed on the tray surface between the liquid receiving pans and one or more mass transfer decks; and (6) one or more dividers disposed on the tray surface and configured to partition the tray surface into discreet mass transfer decks.

The present invention may also be characterized as a mass transfer column comprising: a column having a cylindrical wall having an interior surface and an exterior surface; and a plurality of the above-described multiple pass downcomer trays attached to the interior surface of the cylindrical wall and arranged in a stacked orientation within the column, and wherein the liquid flow is in a parallel type flow path in vertically successive mass transfer decks of adjacent multiple pass downcomer trays in the column such that as the liquid descends through successive multiple pass downcomer trays in the column, the descending liquid proceeds in a serpentine or semi-circular flow path down through the column.

The invention may also be characterized as a method for liquid-vapor contacting in a mass transfer column, the method comprising the steps of: (a) directing a descending liquid to a plurality of downcomer trays arranged in a stacked orientation within the mass transfer column, each downcomer tray comprising a plurality of downcomers configured for collecting and discharging the liquid from the mass transfer decks; and at least four mass transfer decks on a surface of the downcomer tray with a plurality of apertures through the mass transfer decks on the tray surface; (b) directing an ascending vapor through the mass transfer column to the plurality of downcomer trays and through the plurality of apertures through the at least four mass transfer decks on the tray surfaces; and (c) contacting the ascending vapor passing through the apertures and the descending liquid on the mass transfer decks on the tray surfaces. The above-described method for liquid-vapor contacting in a mass transfer column is further characterized in that the liquid flow is in a parallel type flow path in vertically successive mass transfer decks of adjacent downcomer trays in the mass transfer column and wherein as the liquid descends through successive downcomer trays in the mass transfer column, the descending liquid proceeds in a serpentine or semi-circular flow path down through the mass transfer column.

Within each tray in the mass transfer column, the plurality of downcomers include one or more central downcomers disposed proximate a central axis of the annular base and two or more peripheral downcomers disposed proximate peripheral edges of the downcomer tray and spaced apart from the central axis. In addition, the liquid flow traversing each of the mass transfer decks on the multiple pass downcomer tray surface is in the opposite direction to the liquid flow traversing adjacent mass transfer sections on the same tray surface.

BRIEF DESCRIPTION OF THE DRAWINGS

While the specification concludes with claims specifically pointing out the subject matter that Applicant regards as the invention, it is believed that the invention will be better understood when taken in connection with the accompanying drawing in which:

DETAILED DESCRIPTION

Figure 1:
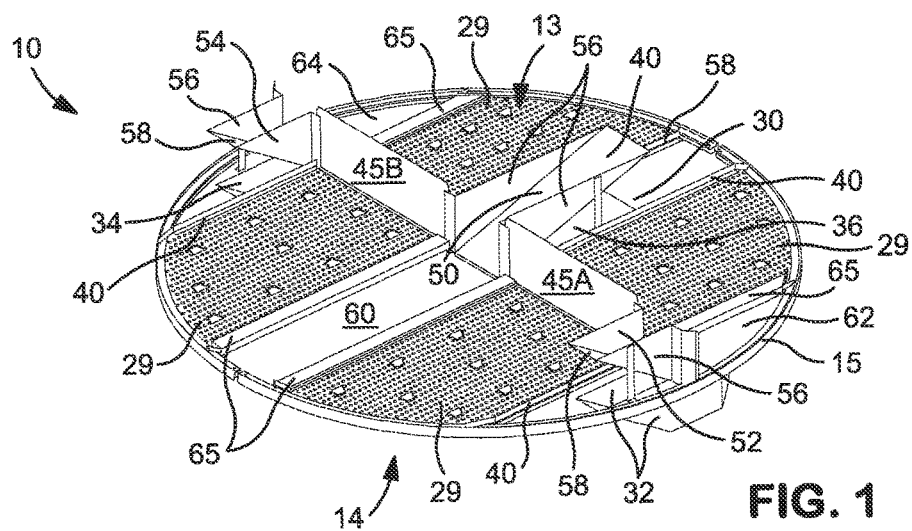
FIG. 1 is a pictorial view of the multiple pass downcomer tray for a mass transfer column in accordance with the present invention.
Figure 2:
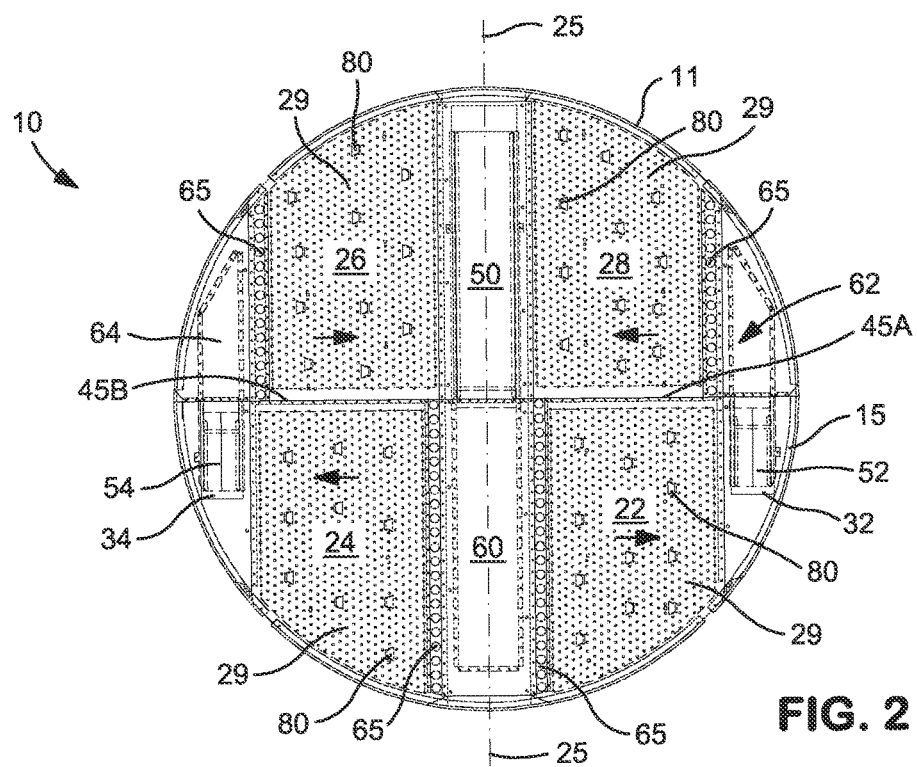
FIG. 2 is a top plan view of the multiple pass downcomer tray for a mass transfer column of FIG. 1.
Figure 3:
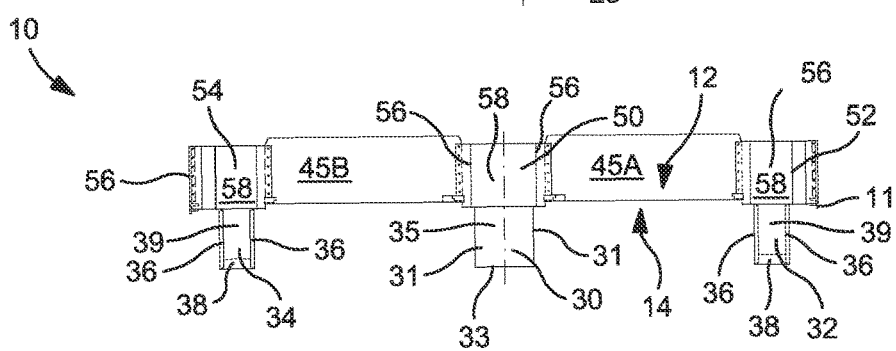
FIG. 3 is a cross sectional view of the multiple pass downcomer tray for a mass transfer column of FIG. 2.

Turning now to the Figures, there is shown an embodiment of the multiple pass downcomer tray 10 for a mass transfer column. The multiple pass downcomer tray 10 includes an annular tray of aluminum or stainless steel having an annular edge 11, a top tray surface 12 and a bottom tray surface 14. Annular support ring 15 is attached to the annular edge 11 of the tray to facilitate connection to the interior wall of the mass transfer column (not shown). On the upper tray surface 12 of the illustrated embodiment there are four mass transfer decks 22, 24, 26, 28 each having a plurality of apertures 29 extending through the tray 10 allowing vapor to ascend from beneath the bottom tray surface 14 to above the top tray surface 12 where the vapor interacts with any traversing liquid on the mass transfer decks. The four mass transfer decks 22, 24, 26, 28 in the illustrated embodiment are disposed in separate quadrants of the annular tray such that each mass transfer deck is disposed adjacent to at least two other mass transfer decks. The multiple pass downcomer tray 10 further includes a central downcomer 30 disposed along a central axis 31 of the annular tray 10 between two of the mass transfer decks and configured for collecting and discharging the liquid traversing the two adjacent mass transfer decks to an underlying tray (not shown).

The multiple pass downcomer trays 10 also include two peripherally disposed downcomers 32, 34 spaced apart from the central axis 25 and disposed proximate the annular support ring 15. Each of the peripherally disposed downcomers 32, 34 is configured to be proximate to and in flow communication with one of the mass transfer decks. As seen in the Figures, the first peripherally disposed downcomer 32 is disposed proximate to mass transfer deck 22 while the second peripherally disposed downcomer 34 is disposed proximate to mass transfer deck 24. As with the central disposed downcomer 30, each of the peripherally disposed downcomers 32, 34 are configured for collecting and discharging the liquid traversing the adjacent mass transfer decks to an underlying tray (not shown). In the illustrated embodiments, the central downcomer 30 comprises a pair of lateral sidewalls 31 and at least one end wall 33 connecting the lateral side walls 31 to define a central channel 35 for the descending liquid flow exiting the multiple pass downcomer trays 10. Likewise, the peripheral downcomers 32, 34 each also include a pair of lateral sidewalls 36 and at least one end wall 38 connecting the lateral side walls 36 to define peripheral channels 39 for the descending liquid flow.

Disposed on the upper or top tray surface 12 are a plurality of weirs 40 disposed proximate each downcomer 30, 32, 34 which are sized and configured to impede the traversing liquid flow from the mass transfer decks 22, 24, 26, 28 to the associated downcomer 30, 32, 34. Each of the multiple pass downcomer trays 10 may also include one or more dividers 45A, 45B disposed on the upper or top tray surface 12 which are positioned and configured to partition or divide the top tray surface 12 into discreet mass transfer decks. For example, one of the dividers 45A partitions mass transfer area 22 and mass transfer area 28 whereas the other divider 45B partitions mass transfer area 24 and mass transfer area 26.

A plurality of liquid channel structures or chutes 50, 52, 54 are disposed on the upper or top tray surface 12 proximate each downcomer 30, 32, 34. The liquid channel structures or chutes 50, 52, 54 are configured for direct a descending liquid from above the tray 10 and dispersing the descending liquid to one or more of the mass transfer decks 22, 24, 26, 28. Liquid flow descending in chute 50 is received in a liquid receiving pan 60 disposed on the upper or top tray surface 12. A first portion of the liquid flows from the liquid receiving pan 60 over bubble forming structure 65 to mass transfer deck 22 towards the peripherally disposed downcomer 32 while a second portion of the liquid flows from the liquid receiving pan 60 in the opposite direction over bubble forming structure 65 to mass transfer deck 24 towards the peripherally disposed downcomer 34.

With regard to the liquid channel structures or chutes 52, 54 disposed proximate each peripherally disposed downcomer 32, 34, the descending liquid flows down chute 52 into liquid receiving pan 62 disposed on the upper or top tray surface 12 and is directed over bubble forming structure 65 to mass transfer deck 28 towards the centrally disposed downcomer 30. Similarly, the descending liquid flowing down chute 54 is received in liquid receiving pan 64 also disposed on the upper or top tray surface 12 and is directed over bubble forming structure 65 to mass transfer deck 26 also towards the centrally disposed downcomer 30.

Each of the illustrated liquid channel structures or chutes 50, 52, 54 are preferably constructed with a pair of lateral sidewalls 56 extending vertically from the upper or top tray surface 12 and an end wall 58 connecting the lateral side walls to define a ramp to channel the descending liquid to the tray 10 and more particularly to the associated liquid receiving pan 60, 62, 64.

Although not shown, the multiple pass downcomer trays 10 may further include one or more perforated baffles disposed on the liquid receiving pan 60, 62, 64. The perforated baffles are configured and placed at specified locations of the liquid receiving pan 60, 62, 64 to slow the descending liquid and improve distribution of the received liquid to the mass transfer areas.

Figure 4A:
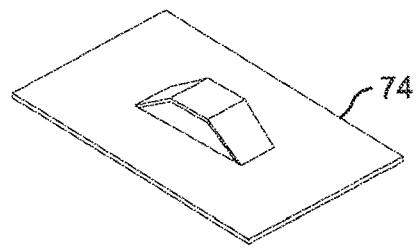
FIGS. 4A through 4K show examples of fixed valves, moveable vales, caged valves, bubble cap devices, directional valves and vapor directing slots used in alternate embodiments of the mass transfer decks on the multiple pass downcomer tray for a mass transfer column in accordance with the present invention.
Figure 4B:
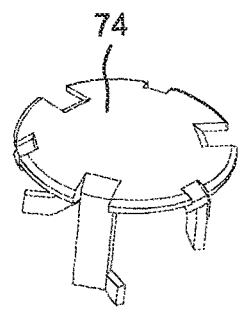
Figure 4C:
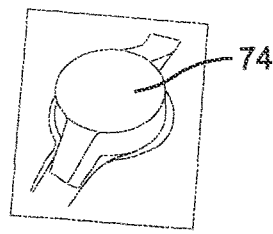
Figure 4D:
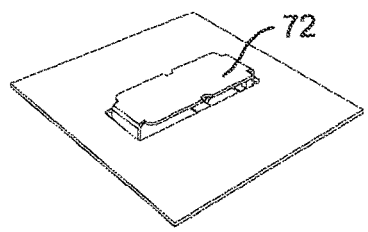
Figure 4E:
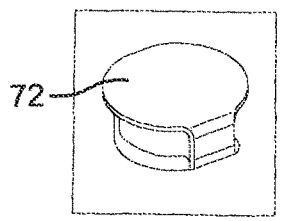
Figure 4F:
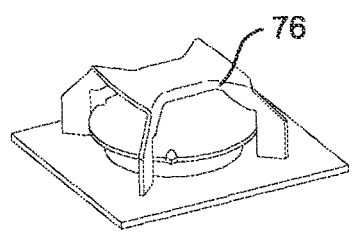
Figure 4G:
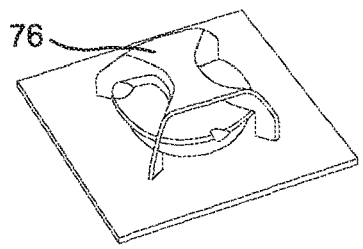
Figure 4H:
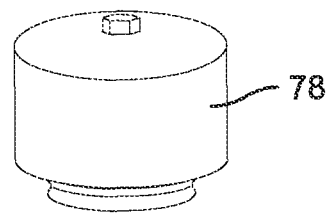
Figure 4I:
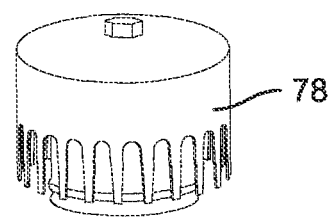

The preferred embodiment of the multiple pass downcomer tray 10 is a sieve tray wherein the apertures in the mass transfer decks comprise a plurality of small holes 29. Alternatively, as shown in FIGS. 4A through 4G, the multiple pass downcomer trays may be valve trays where the apertures in each of the mass transfer decks further comprise a plurality of openings with moveable valves 72 disposed above the openings, a fixed valve 74 disposed above the openings, a caged valve 76. Still further, the multiple pass downcomer trays may be a bubble cap tray having a plurality of bubble cap type devices 78 as shown in FIGS. 4H and 4I disposed on the mass transfer decks over the openings 70.

Figure 4J:
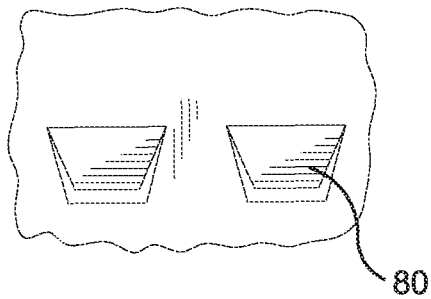
Figure 4K:
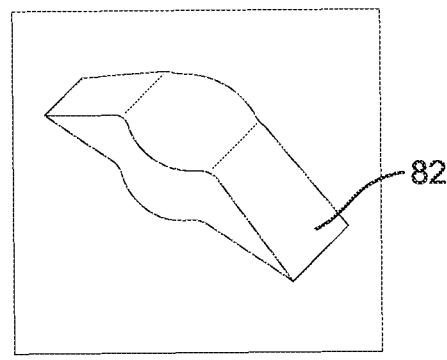

Optionally, some of the apertures in the four mass transfer decks 22, 24, 26, 28 further comprise vapor-directing slots 80 or directional valves 82 as shown in FIGS. 4J and 4K that are oriented in operation to promote the movement of liquid across the mass transfer deck to the corresponding downcomer. For example, the vapor-directing slots 80 in mass transfer deck 22 are oriented to promote the movement of liquid toward peripherally disposed downcomer 32 (direction of Arrow A). Similarly, the vapor-directing slots 80 in mass transfer deck 24 are oriented to promote the movement of liquid in the opposite direction toward peripherally disposed downcomer 34 (direction of Arrow B). Any vapor-directing slots 80 in mass transfer decks 26, 28 are oriented to promote the movement of liquid in toward the central disposed downcomer 30 (directions of Arrow C and Arrow D, respectively).

With or without the vapor-directing slots 80, the above described tray flow patterns are designed such that the liquid flow traversing each of the four mass transfer decks 22, 24, 26, 28 is in the opposite direction to the liquid flow traversing in the two adjacent mass transfer sections. For example, the movement of liquid in mass transfer deck 22 (direction of Arrow A) toward peripherally disposed downcomer 32 is opposite to the movement of liquid in mass transfer deck 24 (direction of Arrow B) and opposite to the movement of liquid in mass transfer deck 28 (direction of Arrow D). Similarly, the movement of liquid in mass transfer deck 24

(direction of Arrow B) toward peripherally disposed downcomer 34 is opposite to the movement of liquid in mass transfer deck 22 (direction of Arrow A) and opposite to the movement of liquid in mass transfer deck 26 (direction of Arrow C). Likewise, the movement of liquid in mass transfer deck 26 (direction of Arrow C) toward the centrally disposed downcomer 30 is opposite to the movement of liquid in mass transfer deck 24 (direction of Arrow B) and opposite to the movement of liquid in mass transfer deck 28 (direction of Arrow D). Finally, the movement of liquid in mass transfer deck 28 (direction of Arrow D) toward centrally disposed downcomer 30 is opposite to the movement of liquid in mass transfer deck 26 (direction of Arrow C) and opposite to the movement of liquid in mass transfer deck 22 (direction of Arrow A).

The above-described multiple pass downcomer trays are particularly suited for use in a mass transfer column where a plurality of the trays are arranged in a stacked orientation within the mass transfer column. When arranged in a vertically aligned manner such that the central downcomer, the peripheral downcomers as well as the respective mass transfer decks and chutes of adjacent trays are vertically aligned, the arrangement achieves the Lewis Case 2 type parallel flow arrangement. In other words, the liquid flow across each of the four mass transfer decks in successive trays (i.e. above and below) is in the same direction. The present invention advantageously combines both a parallel flow arrangement between successive or adjacent trays together with multiple pass flow arrangement on a given tray. As a result, the mass transfer efficiency of the column having the above-described multiple pass trays that are vertically aligned is greatly improved compared to conventional tray designs because of the shorter average flow paths (for a similarly sized column), reduced weir loading, and a uniform driving forces for mass transfer on all mass transfer decks in a given tray or on the vertically aligned mass transfer decks.

An embodiment of the gas-vapor mass transfer column comprises a column having a cylindrical wall having an interior surface and a plurality of the above-described multiple pass downcomer trays attached to the interior surface of the cylindrical wall. The plurality of multiple pass downcomer trays are vertically aligned and preferably connected to the vertically adjacent trays via a plurality of connecting rods (not shown) to provide structural stability to the column internals.

The liquid flow traversing each of the mass transfer decks on a first tray is in a multi-pass flow arrangement vis-à-vis the other mass transfer decks on that first tray and is also in a parallel type flow path in relation to vertically successive mass transfer decks of adjacent trays in the column disposed above and/or below the first tray. As the liquid descends through successive trays in the column, the descending liquid also proceeds in a serpentine or semi-circular flow path down through the column.

While the present invention has been described with reference to a preferred embodiment and operating method associated therewith, it should be understood that numerous additions, changes and omissions to the disclosed multiple pass downcomer tray and associated method can be made without departing from the spirit and scope of the present invention as set forth in the appended claims.

What is claimed is:

1. A multiple pass, parallel flow downcomer tray for a mass transfer column comprising:
    an annular tray having a tray surface;
    an annular support ring attached to the tray;
    at least four mass transfer decks on the tray surface of the annular tray and each of the at least four mass transfer decks having a plurality of apertures through the tray surface, and wherein each mass transfer deck being disposed adjacent to at least two other mass transfer decks and configured to provide contact between an ascending vapor passing through the apertures and a traversing liquid on the tray surface; and
    a plurality of downcomers configured for collecting and discharging the liquid from the mass transfer decks, including one or more central downcomers disposed proximate a central axis of the annular tray and two or more peripheral downcomers disposed proximate the annular support ring and spaced apart from the central axis, wherein each peripheral downcomer defines a ramp-like peripheral channel and the central downcomer defines a ramp-like central channel for a descending liquid flow;
    wherein the ramp-like peripheral channels for the descending flow are configured to direct the descending liquid flow from a collection location on one of the at least four mass transfer decks to a discharge location below an adjacent mass transfer deck and the ramp-like central channel for the descending flows is configured to direct the descending liquid flow from a collection location proximate a central axis and between two adjacent mass transfer decks to a discharge location opposite the collection location but proximate the central axis and below two other adjacent mass transfer decks;
    wherein at least two of the at least four mass transfer decks are configured to discharge the traversing liquid into the two or more peripheral downcomers and at least two of the at least four mass transfer decks are configured to discharge the traversing liquid into the one or more central downcomers; and
    wherein the liquid flow traversing each of the at least four mass transfer decks is in the opposite direction to the liquid flow traversing in at least two adjacent mass transfer decks.

2. A multiple pass, parallel flow downcomer tray of claim 1, wherein the tray is a sieve tray and the apertures in the mass transfer decks further comprise a plurality of holes.

3. A multiple pass, parallel flow downcomer tray of claim 1, wherein the tray is a bubble cap tray comprising a plurality of bubble cap type devices disposed on the mass transfer decks.

4. A multiple pass, parallel flow downcomer tray of claim 1, wherein the apertures in the mass transfer decks further comprise vapor-directing slots in the tray surface to promote the movement of liquid across the mass transfer deck.

5. A multiple pass, parallel flow downcomer tray of claim 1, wherein the tray is a valve tray and the apertures in each mass transfer decks further comprise a plurality of openings with moveable valves disposed above the openings.

6. A multiple pass, parallel flow downcomer tray of claim 1, wherein the tray is a valve tray and the apertures in each mass transfer decks further comprise a plurality of openings with a fixed valve structure disposed above the openings.

7. A multiple pass, parallel flow downcomer tray of claim 1, wherein the peripheral downcomers further comprises a pair of lateral sidewalls and at least one end wall connecting the lateral side walls to define the channel for the descending liquid flow.

8. A multiple pass, parallel flow downcomer tray of claim 1, wherein the one or more central downcomer further comprises a pair of lateral sidewalls and at least one end wall connecting the lateral side walls to define the channel for the descending liquid flow exiting the multiple pass downcomer tray.

9. A multiple pass, parallel flow downcomer tray of claim 1, further comprising one or more dividers disposed on the tray surface and configured to partition the tray surface into discreet mass transfer decks.

10. A multiple pass, parallel flow downcomer tray of claim 1, further comprising a plurality of weirs disposed proximate each downcomer and configured to impede the traversing liquid flow to the downcomers.

11. The multiple pass, parallel flow downcomer tray of claim 1, wherein the central downcomer further comprises:
a pair of lateral sidewalls extending vertically from the tray surface; and
an end wall connecting the lateral side walls to define the ramp-like peripheral channel for the descending liquid.

12. A multiple pass, parallel flow downcomer tray of claim 1, wherein the peripheral downcomers further comprise:
a pair of lateral sidewalls extending vertically from the tray surface; and
an end wall connecting the lateral side walls to define the ramp-like peripheral channel for the descending liquid.

13. A multiple pass, parallel flow downcomer tray of claim 12, further comprising: a liquid receiving pan; and one or more bubble forming structures disposed on the tray surface between the liquid receiving pan and one or more mass transfer decks.

14. A multiple pass, parallel flow downcomer tray of claim 12, further comprising: a liquid receiving pan; and a perforated baffle disposed on the liquid receiving pan and configured to improve distribution of the liquid over the mass transfer areas.

15. A mass transfer column comprising:
a column having a cylindrical wall having an interior surface and an exterior surface;
a plurality of multiple pass, parallel flow downcomer trays attached to the interior surface of the cylindrical wall and arranged in a stacked orientation within the column, wherein each of the multiple pass, parallel flow downcomer trays further comprise:
(i) an annular base having a tray surface;
(ii) an annular support ring attached to the base;
(iii) at least four mass transfer decks on the tray surface having a plurality of apertures through the tray surface and configured to provide contact between an ascending vapor passing through the apertures and a traversing liquid on the tray surface; and
(iv) a plurality of downcomers configured for collecting and discharging the liquid from the mass transfer decks, including one or more central downcomers disposed proximate a central axis of the annular base and two or more peripheral downcomers disposed proximate the annular support ring and spaced apart from the central axis, wherein each peripheral downcomer defines a ramp-like peripheral channel and the central downcomer defines a ramp-like central channel for a descending liquid flow;
wherein the peripheral channels for the descending flow are configured to direct the descending liquid flow from a collection location on one of the at least four mass transfer decks to a discharge location below an adjacent mass transfer deck and the central channel for the descending flows is configured to direct the descending liquid flow from a collection location proximate a central axis and between two adjacent mass transfer decks to a discharge location opposite the collection location but proximate the central axis and below two other adjacent mass transfer decks;
wherein each of the downcomers defining a channel for liquid flow;
wherein the liquid flow traversing each of the at least four mass transfer decks on a tray surface is in the opposite direction to the liquid flow traversing in the at least two adjacent mass transfer sections on the same tray surface;
wherein the liquid flow is in a parallel type flow path in vertically successive mass transfer decks of adjacent multiple pass downcomer trays in the column; and
wherein as the liquid descends through successive multiple pass downcomer trays in the column, the descending liquid proceeds in a serpentine or semi-circular flow path down through the column.

16. The mass transfer column of claim 15 further comprising a plurality of connecting rods rigidly connecting adjacent multiple pass, parallel flow downcomer trays to one another.

17. The mass transfer column of claim 15 wherein the multiple pass, parallel flow downcomer tray is a bubble cap tray further comprising a plurality of bubble cap type devices disposed on the mass transfer decks.

18. The mass transfer column of claim 15, wherein the multiple pass, parallel flow downcomer trays further comprise sieve trays and the apertures in the mass transfer decks on the multiple pass downcomer trays comprise a plurality of holes.

19. The mass transfer column of claim 15, wherein the apertures in the mass transfer decks on the multiple pass, parallel flow downcomer trays further comprise vapor-directing slots in the tray surfaces to promote the movement of liquid across the mass transfer decks.

20. The mass transfer column of claim 15, wherein one or more of the multiple pass, parallel flow downcomer trays are valve trays and the apertures in each mass transfer decks on the valve trays further comprise a plurality of openings with moveable valves disposed above the openings.

21. The mass transfer column of claim 15, wherein one or more of the multiple pass, parallel flow downcomer trays are valve trays and the apertures in each mass transfer decks on the valve trays further comprise a plurality of openings with a fixed valve structure disposed above the openings.

22. The mass transfer column of claim 15, wherein the peripheral downcomer on a multiple pass, parallel flow downcomer tray further comprises a pair of lateral sidewalls and at least one end wall connecting the lateral side walls to define the channel for descending liquid flow to the adjacent tray below the peripheral downcomer.

23. The mass transfer column of claim 15, wherein the one or more central downcomer on the multiple pass, parallel flow downcomer tray further comprises a pair of lateral sidewalls and at least one end wall connecting the lateral side walls to define the channel for descending liquid flow to the adjacent tray below the one or more central downcomer.

24. The mass transfer column of claim 15, further comprising one or more dividers disposed on the tray surface and configured to partition the tray surface of the multiple pass, parallel flow downcomer tray into discreet mass transfer decks.

25. The mass transfer column of claim 15, wherein each multiple pass, parallel flow downcomer tray further comprises a plurality of weirs disposed proximate each downcomer and configured to impede the traversing liquid flow to the downcomers.

26. The mass transfer column of claim 15, wherein the peripheral downcomer on each multiple pass, parallel flow downcomer tray further comprises:
   a pair of lateral sidewalls extending vertically from the tray surface; and
   an end wall connecting the lateral side walls to define the ramp-like peripheral channel for the descending liquid.

27. The mass transfer column of claim 15, wherein the central downcomers on each multiple pass, parallel flow downcomer tray further comprise:
   a pair of lateral sidewalls extending vertically from the tray surface; and
   an end wall connecting the lateral side walls to define the ramp-like central channel for the descending liquid.

28. The mass transfer column of claim 27, wherein each multiple pass, parallel flow downcomer tray further comprises: a liquid receiving pan, and one or more bubble forming structures disposed on the tray surface between the liquid receiving pan and one or more mass transfer decks.

29. The mass transfer column of claim 27, further comprising: a liquid receiving pan, and a perforated baffle disposed on the liquid receiving pan and configured to improve distribution of the liquid over the mass transfer areas.

* * * * *